United States Patent [19]

Behnke

[11] Patent Number: 5,694,751
[45] Date of Patent: Dec. 9, 1997

[54] SENSING DEVICE FOR AUTOMATIC SIDE GUIDANCE OF SELF-PROPELLING AGRICULTURAL MACHINE

[75] Inventor: Willi Behnke, Steinhagen, Germany

[73] Assignee: Claas Ohg Beschrankt Haftende Offene Handelsgesellschaft, Harsewinkel, Germany

[21] Appl. No.: 546,813

[22] Filed: Oct. 23, 1995

[30] Foreign Application Priority Data

Nov. 24, 1994 [DE] Germany ............ 44 41 841.8

[51] Int. Cl.$^6$ ................................. A01D 34/00
[52] U.S. Cl. ............................. 56/10.2 F; 56/DIG. 15
[58] Field of Search ............... 56/10.2 F, 10.2 E, 56/10.2 D, 10.2 R, DIG. 15

[56] References Cited

U.S. PATENT DOCUMENTS 3,952,828   4/1976   Stampfer et al. ............... 56/10.2 F
5,185,990   2/1993   Barnes et al. .................... 56/62 X
5,307,611   5/1994   Vardeman et al. .............. 56/10.2 F

FOREIGN PATENT DOCUMENTS

106771    8/1973   Germany.
2705491  10/1977   Germany.
3237861  10/1982   Germany.

Primary Examiner—Terry Lee Melius
Attorney, Agent, or Firm—Michael J. Striker

[57] ABSTRACT

A sensing device for automatic side guidance of self-propelling agricultural machine provided with a unit for mowing vegetation formed in a row culture with stubble rows on a field, the sensing device has at least one sensor which senses a row of the vegetation by a lateral abutment, a unit for converting a movement of the sensor into electrical control signals, and a control unit receiving the electrical control signals and controlling wheels of the agricultural machine. The sensor is formed as a stubble sensing element.

23 Claims, 6 Drawing Sheets

SENSING DEVICE FOR AUTOMATIC SIDE GUIDANCE OF SELF-PROPELLING AGRICULTURAL MACHINE

BACKGROUND OF THE INVENTION

The present invention relates to a sensing device for automatic side guidance of a self-propelling harvesting machine.

More particularly, it relates a sensing device for such an agricultural machine which is provided for example with an oscillatingly driveable cutter for mowing vegetations formed as a row culture, in particular grain, so that stubble rows are formed on the field. The sensing device has at least one movable sensor which senses at least one row of the vegetation by lateral abutment, and its movement is converted into electrical control signals which, after corresponding processing in a control device, are supplied to the steering device of the agricultural machine.

Automatic side guides for influencing the steering of the harvesting machine in order to relieve the driver of a self-propelling agricultural machine are known in many modifications. The sensor is usually a transmitter of a regulating circuit. Mechanical sensors are used more extensively, for example in form of a bracket as disclosed in the patent documents DE 27 05 491 C2, and DD 106 771 or in form of capacitive sensors as disclosed in the patent document DE 32 37 861 A1.

The sensing devices are mounted in all agricultural machines at such locations that they are active inside the not yet harvested row culture. The row cultures in question are for example corn, beets, carrots, etc. The movement of the sensor is transmitted for example to an angle transmitter formed as an electrical regulating resistance for producing electrical control signals. The known sensing devices are exclusively used for such agricultural machines which harvest vegetation arranged in rows with a relatively great distance from one another, for example 50 cm and more. Moreover, with such vegetations it is guaranteed that they counteract a relatively great force to the sensor. This is provided in the case of carrots, beets and similar vegetations in such a way that they are located at least partially in the ground. When the vegetation is corn, the stalk is relatively thick and a relatively great force can be applied by the sensor also. Moreover, with the above mentioned row cultures during harvesting an upright, definite position of the individual plants within certain limits is guaranteed. Therefore the sensing by the sensor of the sensing device is not problematic.

For row cultures having thin stalks the situation is basically different. The distance between the individual seed rows is normally between 100 and 120 mm. Moreover, depending on weather conditions and the like, they can form so-called lying grains. A definite position of the plants in the individual plant rows is therefore not guaranteed. As a result, during harvesting changing conditions occur. Also, the forces generated during the row sensing must be extremely low in the case of thin-stalk blades of all grain types, since the blades buckle and no more can be engaged by a mowing projection which leads to corresponding harvest losses. In view of these specifics, the known sensing devices cannot be utilizes for grain cultures.

SUMMARY OF THE INVENTION

Accordingly, it is an object of the present invention to provide a sensing device for automatic side guidance of a self-propelling agricultural machine, which avoids the disadvantages of the prior art.

More particularly, it is an object of the present invention to provide a sensing device for automatic side guidance of a self-propelling agricultural machine, which is suitable for harvesting of thin-stalked grain types, in which the individual plant rows are arranged at distances relative to one another and in which it is necessary to take into consideration that the individual plants assume a position which is not suitable for sensing and no longer defined.

In keeping with these objects and with others which will become apparent hereinafter, one feature of the present invention resides, briefly stated, in a sensing device in which a sensor is formed as a stubble sensing element formed substantially of two sensing skis arranged at both sides of a stubble row and guiding with a ground contact, and a horizontal parallel guide turnable about vertical axes.

Since the sensor of the inventive sensing device is formed as a stubble sensing element, harvesting machines can be provided with an automatic side guiding for influencing the steering (autopilot), designed for harvesting of grains or for pressing straw. The known control devices which act on the steerable axle or the steerable wheel can be used in an advantageous manner without changes. The autopilot is adjusted by a driver of the agricultural machine and can be adjusted later on at any time. The term "stubble" is utilized conventionally define to plant residues of mowed vegetations located above the ground. The sensing skis of the stubble sensing element are brought in ground contact, or in other words they slide on the ground. Since the side bending force of an individual stubble is too low to provide a direction pulse to a sensing device, the sensing skis have such a length that their sensing edges sense a plurality of stubbles so as to provide the sum of the side bending forces of the sensed stubbles for obtaining a reliable direction pulse. It is therefore always guaranteed that the stubble row located between the two sensing skis is exactly sensed. The control signal produced from it is used for the regulation of the side guidance. During sensing the horizontal parallel guide guarantees that the sensing skis are always guided between two associated stubble rows so that no faulty operation is possible. The sensor for example activated in a harvester thresher by lowering the cutting mechanism to the cutting position. The terms "vertical" and "horizontal" are related to the normal position of the agricultural machine, in other words when it is located on a horizontal ground. During use on a slope, the corresponding points are arranged in an inclined position.

For row cultures in question it is unavoidable that, for example during the irrigation tracks, a gap is produced within a plant row. For preventing a faulty operation of the stubble sensing element it is therefore possible to provide it with several pairs of sensing skis for sensing the stubble rows. Since it is not excluded that the directly adjoining stubble rows have gaps, the stubble rows to be sensed can be located farther from one another.

In a harvesting thresher, the stubble sensing device can be arranged by means of corresponding holding devices both laterally and also directly behind the cutting mechanism. It is advantageous however when it is located directly behind the cutting mechanism as considered in the forward traveling direction. Therefore, the automatic side guidance can be used also when at the beginning of a harvesting work, laterally near the stock to be harvested a further stock is located.

In accordance with a further embodiment of the present invention, the horizontal parallel guide is formed as four hinge chain, and both leading axles located forwardly during the forward traveling of the agricultural machine are supported in the rotary guide which is turnable about a horizontal axis. This rotary guide makes possible an upward deviation of the stubble sensing device when the sensing skis ride over a foreign body. Moreover, they can be turned upwardly to a transporting position. The formation of the horizontal parallel guide as a four hinge chain provide for the advantage of a structurally simple, and operationally reliable construction. For limiting the movement of the horizontal parallel guides at both sides, it is proposed to provide the rotary guide with two position-controlled abutments which allow an adjustment.

In a structurally simple manner it is proposed to support both leading axles of the horizontal parallel guides with their rear ends in coupling teeth. The coupling teeth is provided with a supporting tube extending transverse to the longitudinal axis of the agricultural machine, and each sensing ski is secured on the supporting tube against a lateral displacement, but is arranged with an adjustable distance relative to one another in a free movable suspension. The coupling piece is a part of the four hinge chain, so as to guarantee the exact parallel guidance. The supporting tube provides the advantage that the sensing skis are exactly adjustable to the different distances of the stubble row. The connection of the sensing skis with the supporting tube by the freely movable suspension provides the advantage that each sensing ski can deviate during the ground unevenness.

The freely movable suspension can be formed in a structurally simple and operationally reliable manner when it is formed as a vertical parallel guide in which both parallelogram levers are supported with their upper ends in a profiled member fixed to the supporting tube parallel and at a distance from one another, while the lower end of the parallelogram levers are supported at a distance relative to one another on the sensing ski. It is advantageous when each parallelogram lever of the vertical parallel guide located forwardly in the forward traveling direction is shorter than the rear parallelogram lever, since than the front region of the sensing skis during riding over a ground unevenness is raised stronger than the rear region.

In order to ensure that each sensing ski is guided reliably between two neighboring stubble rows, the side walls of the front region of each sensing ski is narrowed in a wedge-shaped manner and forms a rounded, arcuate tip at a front end. For overrunning a ground unevenness, the lower end of the front region of each sensing ski is angled to the center region and upwardly. Since it is unavoidable that for eliminating a distance the agricultural machine runs rearwardly, the rear region of each sensing ski is also angled upwardly. Thereby ground unevenness and hindrance can be ran over.

For placing each ski at a foot of the stubble row and not being lifted by ground unevenness, it is proposed to form the lower surface of each sensing ski which faces the ground concave upwardly. The ski therefore runs only on the longitudinal edges. Moreover, it cannot run on a hill between the stubble rows which is eventually thrown by the grain drill. For reliably recognizing a stubble row, the length of each sensing ski extends over the distance of several stubbles of one row. Advantageously, the width of each sensing ski is smaller than the distance between two neighboring stubble rows and approximately equal to 60–80% of this distance. Therefore it is prevented that the sliding skis are pulled over the stubble rows.

In an especially advantageous manner, the rotary guide is held turnably in a holder which is mounted in the front region of the agricultural machine or machine part. Thereby the distance between the side guidance is ensured. When the agricultural machine is a harvester thresher, the holder can be mounted on the rear side of the cutting mechanism which faces away from the cutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
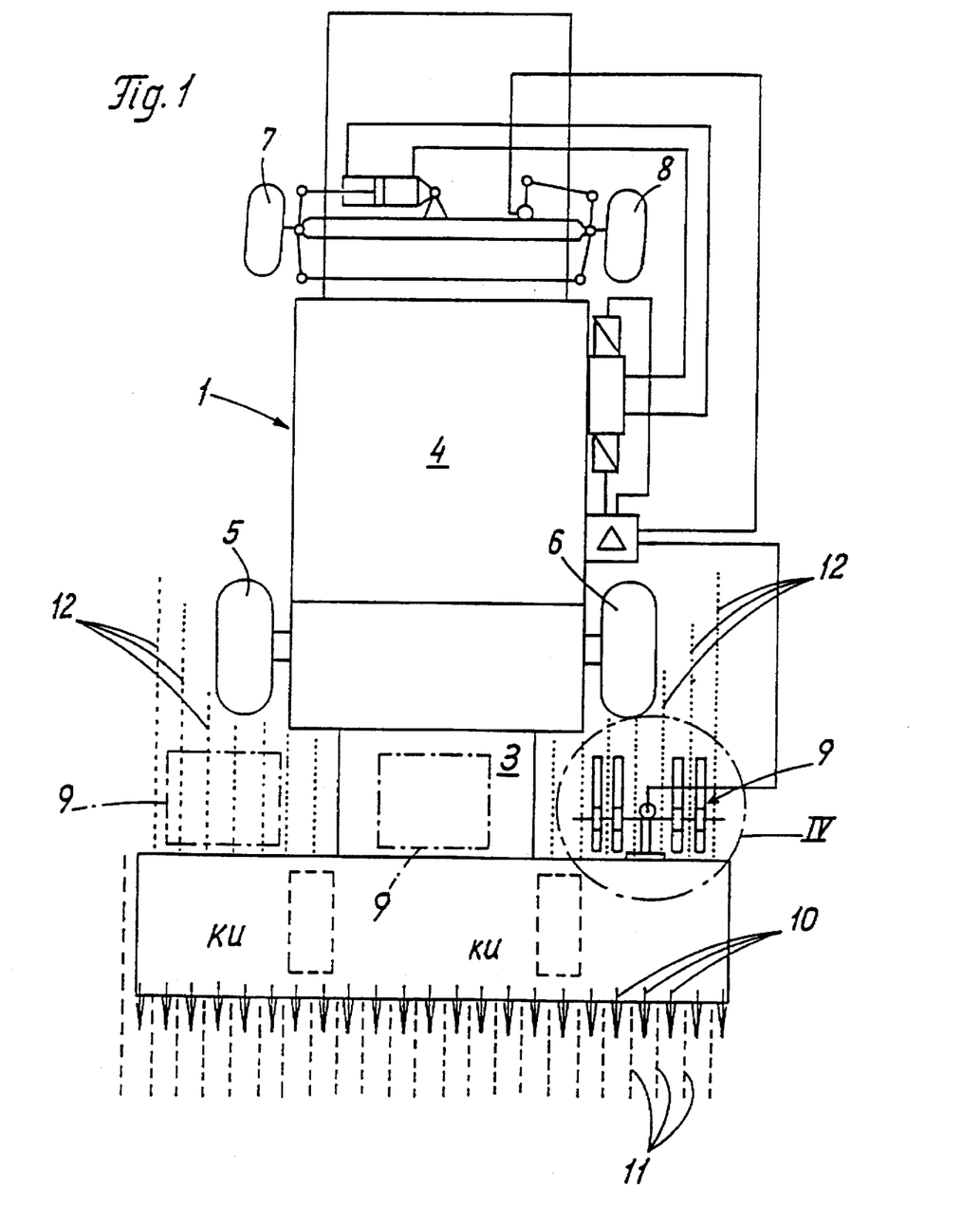
FIG. 1 is a plan view of a harvester thresher provided with a sensing device in accordance with the present invention, with various mounting locations of the device shown in dash-dot lines.

A harvester thresher shown in an exemplary embodiment in FIG. 1 is identified with reference numeral 1 and provided at a front side with a cutting mechanism 2, a drawing-in passage 3 connected with it, and a main machine 4 containing a threshing mechanism. The drawing-in passage opens into the main machine 4. The front wheels 5, 6 of the harvester thresher 1 are driven in a not shown manner, but not steerable. The rear wheels 7, 8 are steerable. This is performed in a known manner through the system of rods and working cylinders.

For automatic side guidance, the harvester thresher 1 is provided with a sensing device 9 which is illustrated further in FIGS. 2–6. In order to simplify the showing, the driveable cutter of the cutter mechanism 2 is not shown. The sensing device 9 is flanged on the rear side of the cutting mechanism 2 which faces away from the cutter. The sensing device 2 produces signals which are converted in electrical control signals for the steering of the rear wheels 7, 8 after corresponding processing. The control of the rear wheels 7, 8 is performed through a known device which is not described in detail, such as for example disclosed in DD-PS 106 771. A plurality of crop lifters 10 are mounted on the front side of the cutting mechanism 2. They pierce the plant rows 11 near the ground as shown in dash-dot lines. After mowing, stubble rows 12 remain on the field. The stubble rows 12 are identified with pointed lines.

Figure 2:
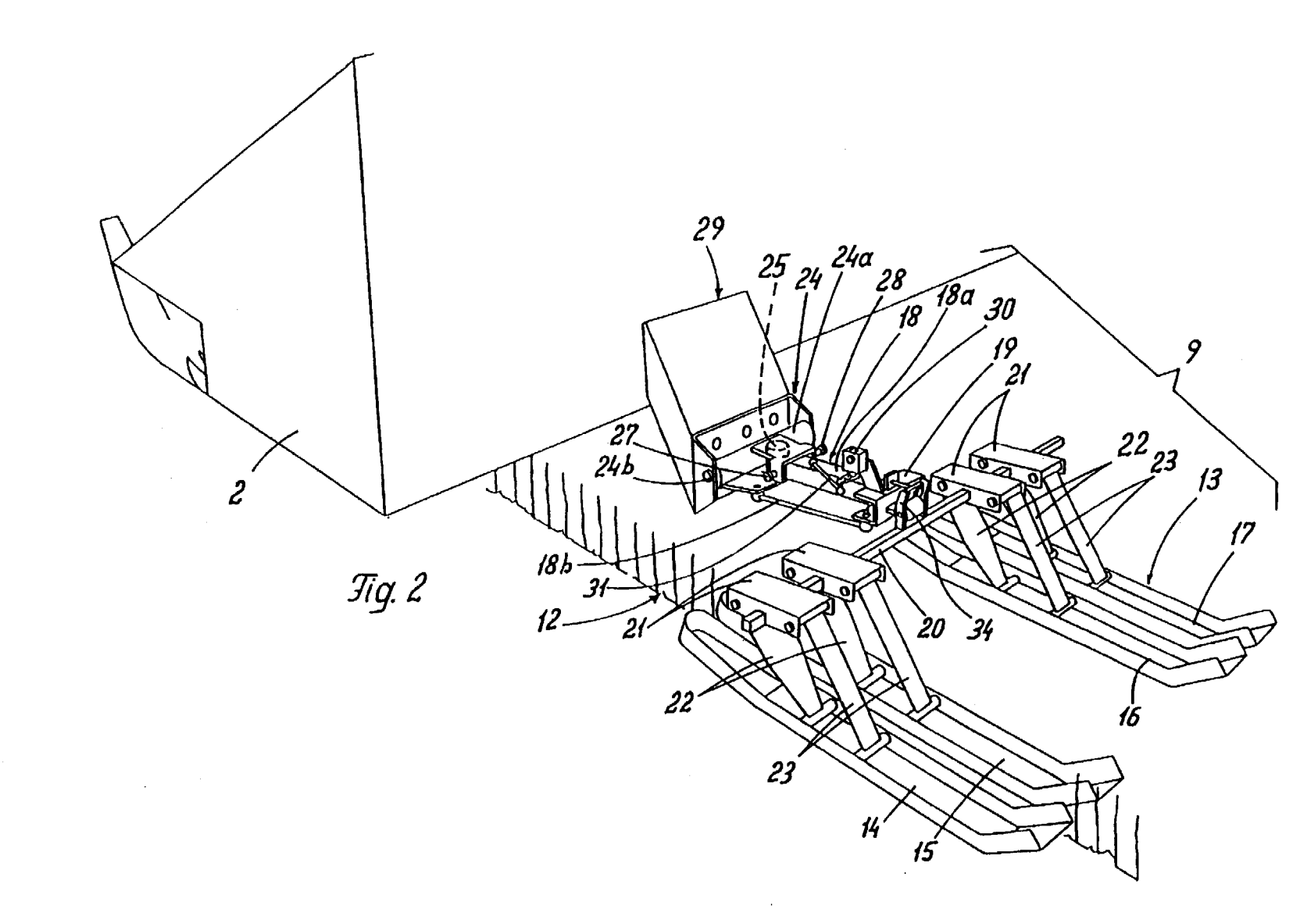
FIG. 2 is a perspective view of the inventive sensing device.

The sensing device 9 which is shown as a whole in FIG. 2 has a sensor which is formed as a stubble sensing element 13. In the subsequent description the two pairs of sensing skis 14, 15, 16, 17 are described. However, it should be mentioned that the present invention can be used with only one or any number of sensing skis. The stubble sensing element 13 is composed in the shown embodiment of four sensing skis 14, 15, 16, 17 and a horizontal parallel guide 18. The horizontal parallel guide 18 is provided with a coupling member 19 formed as a U-profile and arranged at a rear side facing away from the cutting mechanism 2. A supporting tube 10 mounted on the coupling member 19 through a fork member and extends transverse to the longitudinal axis of the harvester thresher. Four U-shaped profiled members 21 are arranged on the supporting tube 20. The profiled members 21 are fixedly connected with the four-cornered supporting tube 20, but are adjustable. Two parallelogram levers 22, 23 are turnably supported in each profile member 21. The opposite lower end of the parallelogram lever 22, 23 are supported rotatably on the sensing skis 14–17.

The profiled member 21 and the parallelogram levers 22, 23 form a vertical parallel guide for the sensing skis 14–17 or a suspension. The front parallelogram levers 22 facing the cutting mechanism 2 can be shorter than the rear parallelogram levers, so that during running over a hindrance or a ground unevenness the corresponding forward region of the sensing skis 14–17 is lifted more than the rear region. The front lower edge of each sensing ski 14–17 is arranged under an obtuse angle relative to the central edge region, or in other words, the lower surface of each sensing ski 14–17 in the front region is inclined to the central lower side. Also, the running over the ground unevenness or hindrances is more favorable in this situation.

The front region of each ski is furthermore wedgeshaped, and therefore the front end extends in an arc so that the sensing skis 14–17 do not penetrate in any ground unevenness. Moreover, the wedge-shaped construction and the sensing skis 14, 15, and 16, 17 arranged in pairs form an inlet wedge for the stubble row 12 as can be seen in particular in FIG. 4. This Figure also shows that the individual stubbles can be arranged with a small offset relative to one another. Since for example during a clogging of the harvester thresher 1 it must run rearwardly, the rear regions of the sensing skis 14–17 are angled. Thereby running over hindrances is possible. In the shown example the sensing skis 14–17 are formed from U-profiles which are open upwardly, or in other words toward the supporting tube 20. Of course, closed profiles can be used as well. FIG. 2 shows the distance between the both pairs of sensing skis 14, 15 and 16, 17 is substantially greater than the distance between two stubble rows 12. Therefore at least one stubble row is sensed when the stalk is damaged by drive tracks.

The horizontal parallel guide 18 includes a main link 18a and a guiding link 18b. The main link 18a is a portion of a tubular profile, while the guiding link 18b is a profile rod. Both ends of the main link 18a are supported turnably. The front end is supported in a rotary guide 24, while the rear end is supported in the profile member 19 turnably about a vertical axis. The front pins are identified by reference numerals 25 and 26. The rotary guide 24 is composed of a sleeve 24a and an upper and a lower bracket which are fixedly mounted on the rear side of the sleeve 24 and through which the front pins 25 pass. The horizontal turning movement of the main link 18a of the horizontal parallel guide is limited by two lateral adjustable abutments 27, 28 formed by adjusting screws. The sleeve 24a is supported on a pin 24b. The pin 24b is supported in vertical parallel legs of a U-profile member. The U-profile member is fixed on a console which is mounted on a rear wall of the cutting mechanism 2. The U-profile member and the console form a fixed holder 29. The stubble sensing element 13 is therefore turnable about the longitudinal axis of the pin 24b or the sleeve 24a. The coupling member 19 connected with the supporting tube 20 is arranged in an angle measuring device formed as a potentiometer 30 which is provided with an actuating lever. An end of a transmitting lever 31 is articulately mounted on the actuating lever and has another end articulately mounted in the front region of the main link 18a. FIG. 2 shows in connection with FIG. 4 that the position of the actuating lever of the potentiometer 30 changes as long as the main link 18a of the horizontal parallel guide 18 moves. The thusly produced signals are utilized after corresponding processing for the steering movement of the rear wheels 7, 8.

Figure 3:
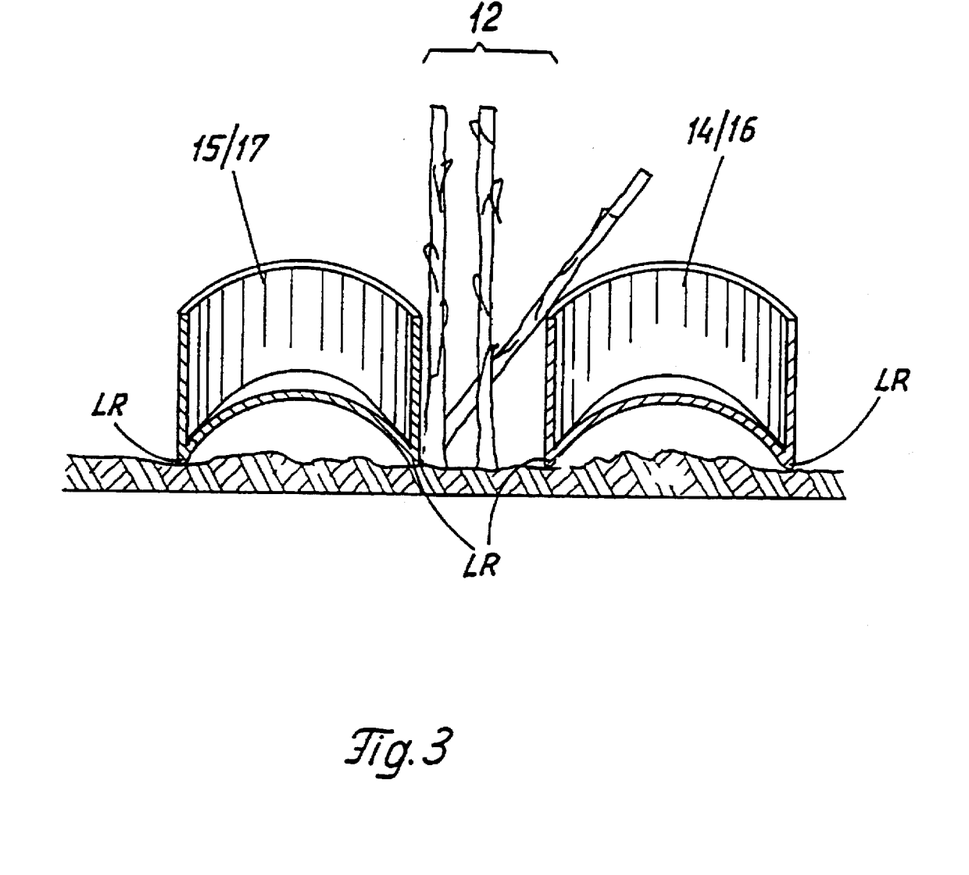
FIG. 3 is a view showing a section of sliding skis at both sides of the stubble row, taken along the line III—III in FIG. 4.

FIG. 3 also shows that the sensing skis 14–17 are formed by U-profile members which are open toward the supporting tube 20. The central leg which faces the ground and is located between two parallel outer legs is not rectilinear but instead is formed so that it raises from the field bottom with offset in direction of the supporting tube 20, so that only the longitudinal edges LR of the sensing skis 14–17 contact the bottom. Thereby a good abutment at the foot of the stubble row 12 is provided. Moreover, the hills which are thrown by the grain drill can be ridden over.

It should be mentioned that the sensing ski not necessary must be formed of U-profile members but instead other means are possible as well for sensing the stubble rows. For example it is recommended that the above described edge guidance of the sensing skis be made by correspondingly deformed wires or iron bands or massive synthetic plastic blocks with corresponding shapes.

Figure 4:
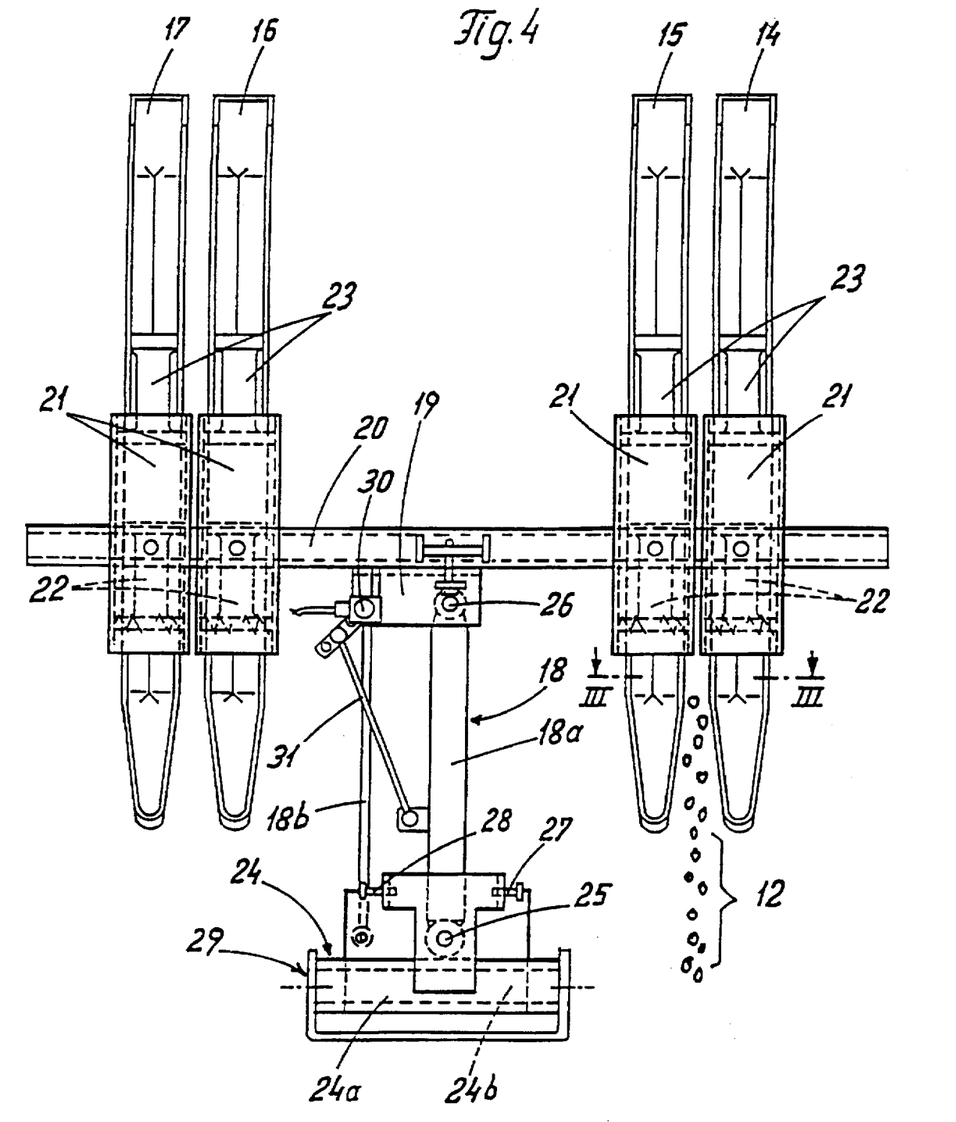
FIG. 4 is a view showing a plan of a detail of the sensing device of FIG. 1, on an enlarged scale.

FIG. 4 shows the whole sensing device on a plan view. In order to see the guiding link 18b which can be located at one or another side of the main link 18a, it is shown in FIG. 4 at the right side as considered in the forward traveling direction. It can be seen also from this Figure that a parallel guide or a four link chain is formed by the main link 18a, the guiding link 18b and the coupling member 19. The guiding link 18b extends parallel to the main link 18a in the base position. This position is assumed automatically during lifting of the cutting mechanism under the action of the weight of the sensing device.

Figure 5:
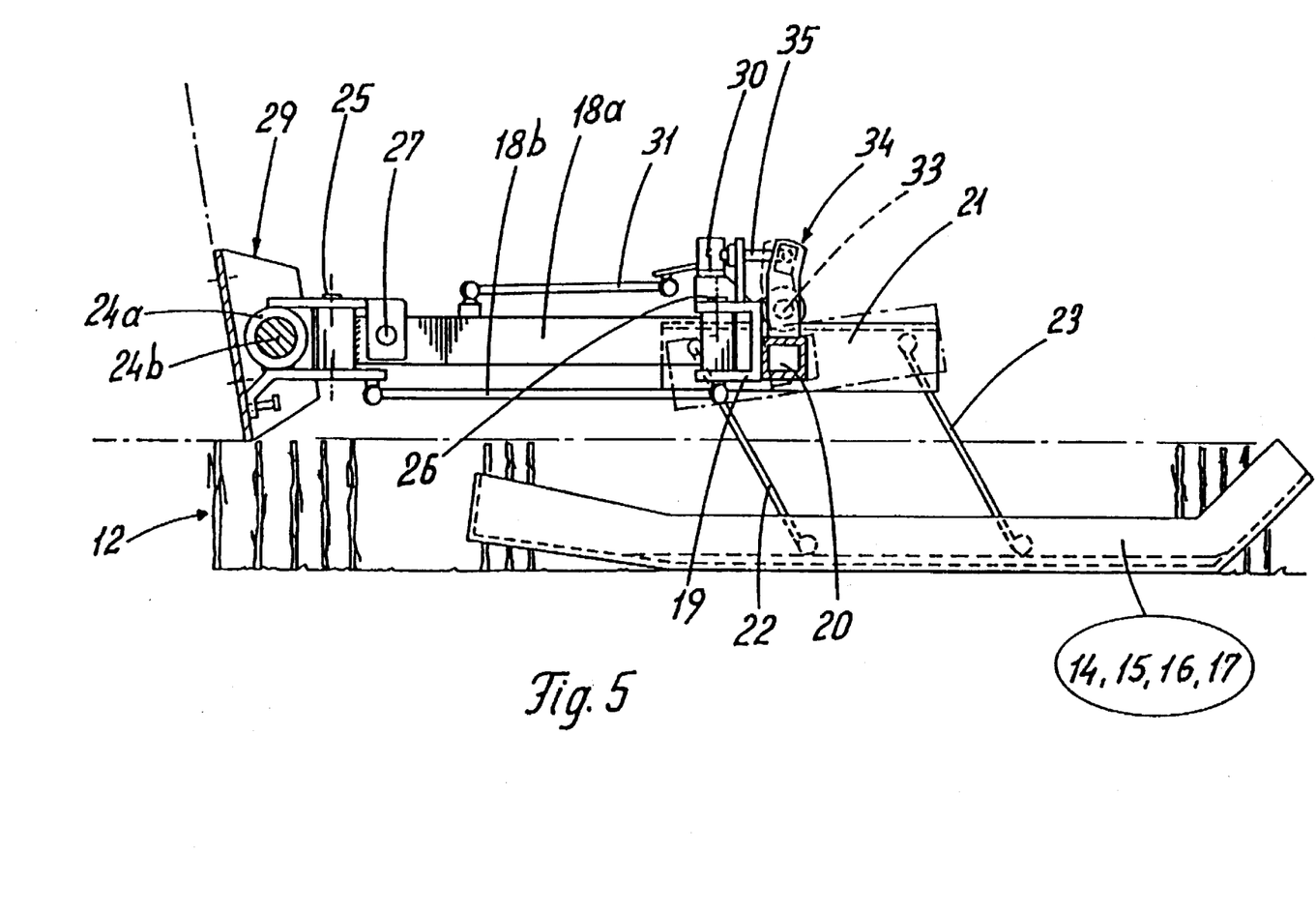
FIG. 5 is a side view of the detail shown in FIG. 4.

FIG. 5 shows that the supporting tube 20 and the profile member 21 which is arranged displaceably on it are adjustable relative to the horizontal parallel guide 18. For this purpose a sleeve 32 is welded on the coupling member 19 on the rear side, and a pin 33 extends in it. A fork 34 is supported on the end of the pin 33 and its outer legs are fixedly connected with the supporting tube 20. The adjustment is performed by an adjusting screw 35. FIG. 5 shown in solid lines the normal position in which the profile member 21 extends horizontally. The inclined position is shown in dash-dot lines.

Figure 6:
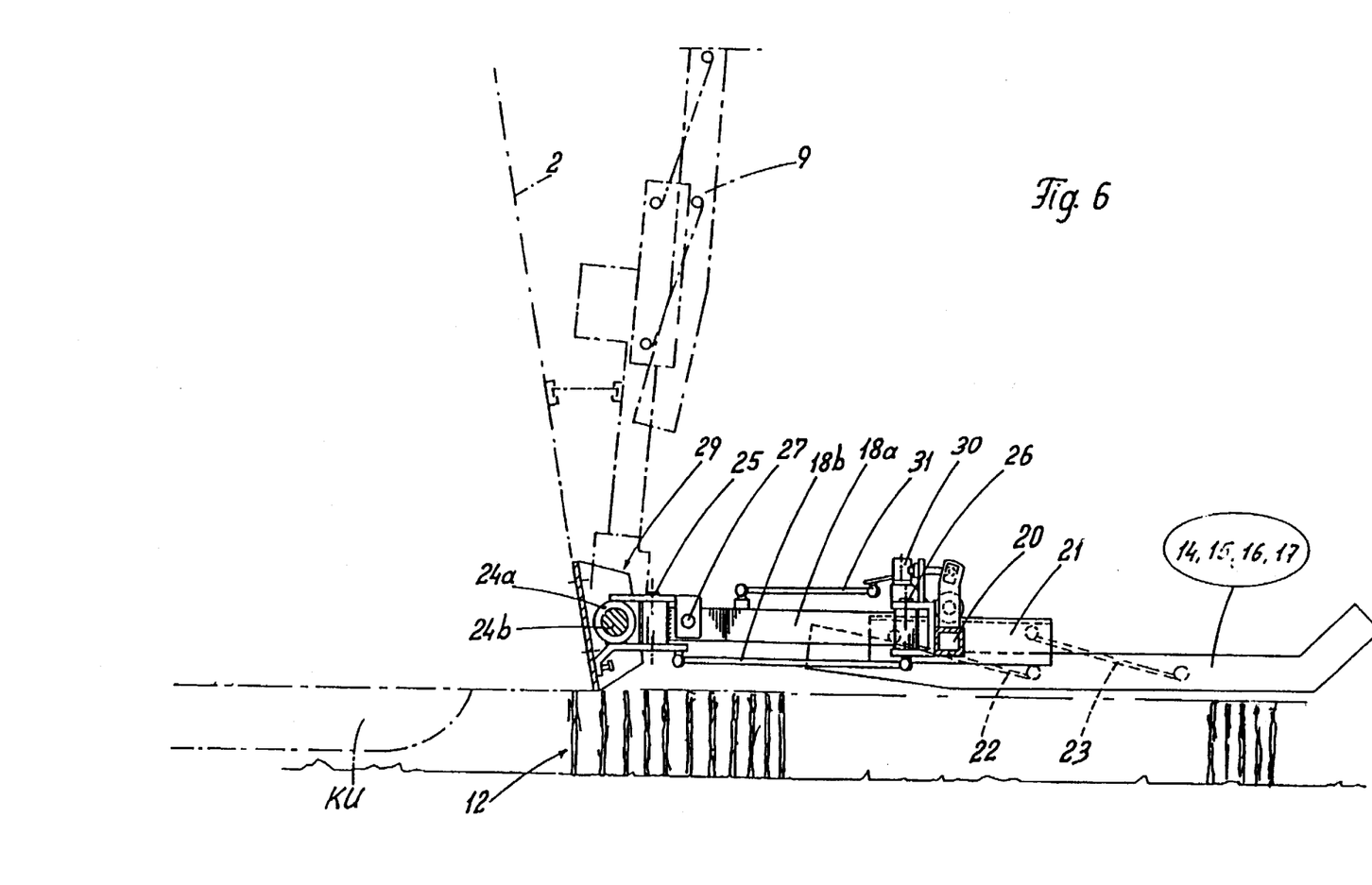
FIG. 6 is a side view corresponding to the view of FIG. 5 but showing the sensing device in an inoperative position and in a transporting position.

FIG. 6 shows how the sensing skis 14–17 can be brought to an inoperative position, when for example the autopilot is turned off. The sensing skis 14–17 are located above the free upper end of the stubble row 12. This position is identified in solid lines. For traveling operation of the harvester thresher 1 the total sensing device can be turned about the central longitudinal axis of the pin 24b or the sleeve 24a by an angle of approximately 90° upwardly, or in other words in direction toward the cutting mechanism 2. This position is shown in dash-dot lines.

With the cutting mechanism 2 lowered, the sensing skis 14–17 adjusted to the distance of the stubble rows 12 are located on the ground. Due to the movement of the harvester thresher 1 and the possibility that the sensing skis 14–17 displace parallel to the stubble rows 12, the sensing skis 14–17 penetrate into the corresponding stubble rows 12. When there are some disturbing factors, such as failing locations, storing locations or traveling congestion in the grain stock, the sensing device is drawn to the central position because of its post-running property and the ground contact. The steering automatic device produces thereby the signal "straight travel". With the turned-on autopilot, the harvester thresher which runs in the row culture obtains the steering signal of the stubble sensing element 13. When the harvester thresher 1 deviates to the right or to the left, the supporting skis 14–17 abut against the stubble row 12. Such a process leads to a steering of the horizontal parallel guide 18 and to delivery of an electric signal by the potentiometer 30. Thereby the harvester thresher 1 is guided accurately. The above described embodiment makes possible to provide a base adjustment to corresponding distances between two stubble rows 13 in a simple manner.

It will be understood that each of the elements described above, or two or more together, may also find a useful application in other types of constructions differing from the types described above.

While the invention has been illustrated and described as embodied in a sensing device for side guidance of self-propelling agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A sensing device for automatic side guidance of self-propelling agricultural machine provided with means for mowing vegetation formed in a row cultural with stubble rows on a field, the sensing device comprising a machine part; at least one movable sensor which is movable relative to said machine part and senses a row of the vegetation by a lateral abutment against the row of the vegetation; means for converting a movement of said sensor into electrical control signals; control means receiving the electrical control signals and controlling wheels of the agricultural machine, said sensor being formed as a stubble sensing element.

2. A sensing device as defined in claim 1, wherein said stubble sensing element has at least one sensing ski which is guidable between two neighboring stubble rows with a ground and plant contact.

3. A sensing device as defined in claim 1, wherein said stubble sensing element includes at least two sensing skis which are guided at both sides of a stubble row with a ground and plant contact, and a horizontal parallel guide movable transverse to a traveling direction of the agricultural machine.

4. A sensing device as defined in claim 1, wherein the mowing means include a cutting mechanism, said stubble sensing element being directly arranged behind the cutting mechanism as considered in a forward traveling direction.

5. A sensing device as defined in claim 1, wherein the agricultural machine is a harvester thresher, and the mowing means includes a cutting mechanism having cutting skis, said stubble sensing element being arranged with lateral offset relative to the cutting skis.

6. A sensing device as defined in claim 2, wherein said sensing skis have side walls with a front region narrowing in a wedge-shaped manner and a front end region extending over an arc.

7. A sensing device as defined in claim 2, wherein said sensing ski has a front region with a lower edge angled to a central region.

8. A sensing device as defined in claim 2, wherein said sensing ski has a rear region with a lower edge which is angled upwardly.

9. A sensing device as defined in claim 2, wherein said sensing ski has a lower surface which faces the ground and extends concavely upwardly.

10. A sensing device as defined in claim 2, wherein said sensing ski has a length selected so as to cover a distance of several stubbles of one stubble row.

11. A sensing device as defined in claim 2, wherein said sensing ski has a width which is selected so as to be smaller than a distance between two neighboring stubble rows.

12. A sensing device as defined in claim 11, wherein said sensing ski has a width which equals to substantially between 60–80% of the distance between two stubble rows.

13. A sensing device as defined in claim 2, wherein said sensing ski has a contour composed of round steel.

14. A sensing device as defined in claim 2, wherein said sensing ski is composed of synthetic plastic material.

15. A sensing device for automatic side guidance of self-propelling agricultural machine provided with means for mowing vegetation formed in a row culture with stubble rows on a field, the sensing device comprising at least one movable sensor which senses a row of the vegetation by a lateral abutment against the row of the vegetation; means for converting a movement of said sensor into electrical control signals; control means receiving the electrical control signals and controlling wheels of the agricultural machine, said sensor being formed as a stubble sensing element, said stubble sensing element including at least two sensing skis which are guided at both sides of a stubble row with a ground and plant contact, and a horizontal parallel guide movable transverse to a traveling direction of the agricultural machine, said horizontal parallel guide being formed as a four hinge chain having two links; and further comprising a rotary guide which is turnable about a horizontal axis, said links having forward ends as considered in a forward traveling direction and being supported with said forward ends in said rotary guide.

16. A sensing device as defined in claim 15, wherein said rotary guide is provided with two abutments for limiting a movement of said horizontal parallel guide.

17. A sensing device as defined in claim 16, wherein said abutments are adjustable.

18. A sensing device as defined in claim 15, wherein the agricultural machine has a front region provided with machine parts; and further comprising a holder fixed to the machine parts in the front region, said rotary guide being turnably supported in said holder.

19. A sensing device as defined in claim 18, wherein the cutting means has a cutting mechanism with a cutter, said holder being mounted on a rear side of the cutting mechanism facing away from the cutter.

20. A sensing device for automatic side guidance of self-propelling agricultural machine provided with means for mowing vegetation formed in a row culture with stubble rows on a field, the sensing device comprising at least one movable sensor which senses a row of the vegetation by a lateral abutment against the row of the vegetation; means for converting a movement of said sensor into electrical control signals; control means receiving the electrical control signals and controlling wheels of the agricultural machine, said sensor being formed as a stubble sensing element said stubble sensing element including at least two sensing skis which are guided at both sides of a stubble row with a ground and plant contact, and a horizontal parallel guide movable transverse to a traveling direction of the agricultural machine, said horizontal parallel guide having two links provided with rear ends; and a coupling member which supports said rear ends of said links and provided with a supporting tube extending transverse to a longitudinal axis of the agricultural machine, said sensing skis being secured on said supporting tube against a lateral displacement and at the same time are adjustable as to their distance from one another by a freely movable suspension.

21. A sensing device as defined in claim 20, wherein each of said suspensions is formed as a vertical parallel guide having two parallelogram levers; and further comprising a profile member which is fixed on said supporting tube, said parallelogram lever having upper ends supported in said profile member parallel and at a distance from one another, said parallelogram levers also having lower ends supported on a corresponding one of said sensing skis at a distance from one another.

22. A sensing device as defined in claim 21, wherein said parallelogram levers have levers located forwardly as considered in a forward traveling direction and rearwardly as considered in the forward traveling direction, said parallelogram levers located forwardly being shorter than said parallelogram levers located rearwardly.

23. A sensing device as defined in claim 20, and further comprising adjusting means for adjusting said supporting tube relative to said horizontal parallel guide about a horizontal axis.

* * * * *